Figure 1:
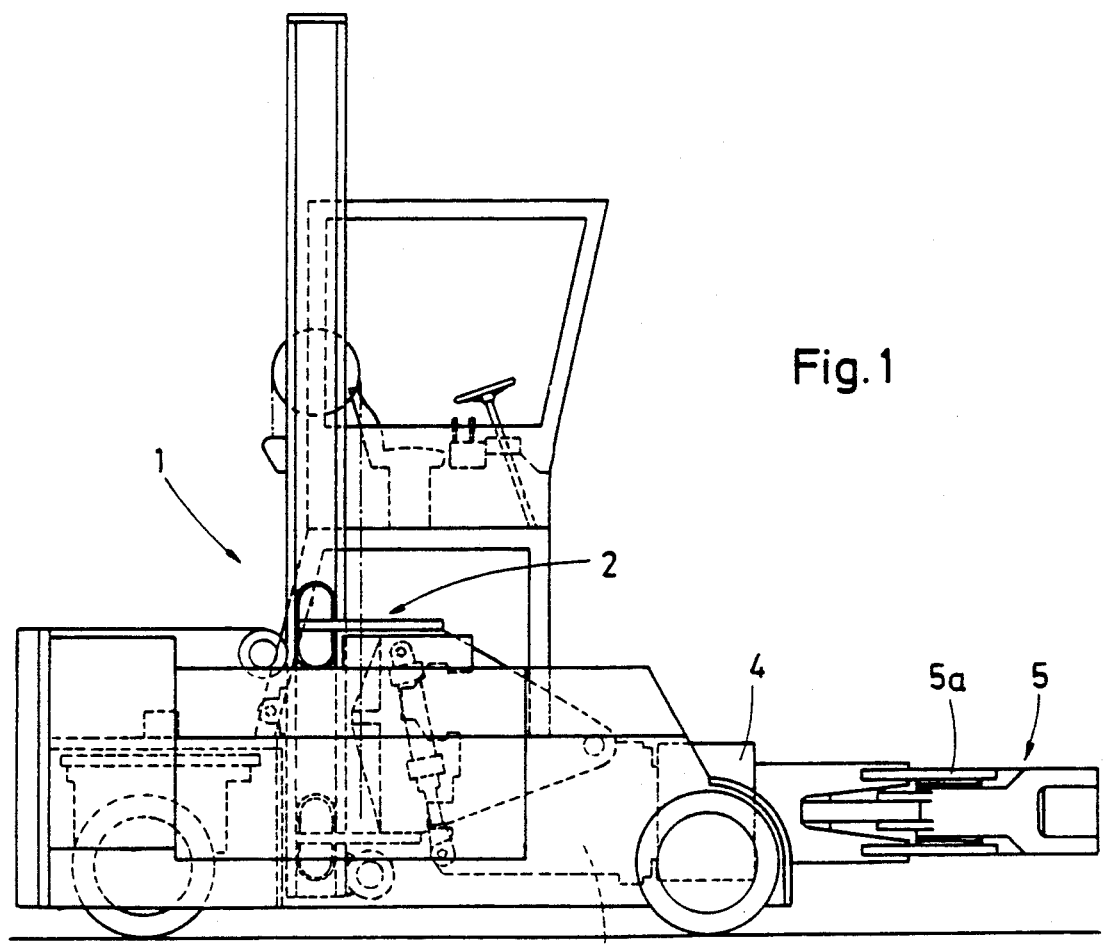

United States Patent

Brücher

Patent Number: 5,118,248
Date of Patent: Jun. 2, 1992

[54] QUICK-ACTION COUPLING FOR FORGE AND CONVEYOR MANIPULATORS

[76] Inventor: Eberhard Brücher, Lohweg 35, D-5900 Siegen, Fed. Rep. of Germany

[21] Appl. No.: 645,407

[22] Filed: Jan. 24, 1991

[30] Foreign Application Priority Data

Feb. 3, 1990 [DE] Fed. Rep. of Germany ....... 4003201

[51] Int. Cl.⁵ .............................................. B66C 1/42
[52] U.S. Cl. ................... 414/729; 294/86.41; 294/88; 403/322; 901/29
[58] Field of Search .............. 414/729, 607, 618, 620, 414/621; 294/88, 86.41; 403/322; 901/27, 28, 29, 41

[56] References Cited

U.S. PATENT DOCUMENTS

| | | | |
|---|---|---|---|
| 2,870,929 | 1/1959 | Quayle | 414/620 |
| 3,567,208 | 3/1971 | Blatt | 294/88 X |
| 4,087,010 | 5/1978 | Stormon | 414/722 |
| 4,596,415 | 6/1986 | Blatt | 294/88 |
| 4,697,472 | 10/1987 | Hiyane | 901/28 X |
| 4,990,022 | 2/1991 | Watanabe et al. | 403/322 |

Primary Examiner—Robert J. Spar
Assistant Examiner—Donald W. Underwood
Attorney, Agent, or Firm—Young & Thompson

[57] ABSTRACT

In order to obviate the need for exchanging tools, e.g. tongs, together with their drive mechanisms, the quick-action coupling device (4) is provided between a toolholder (3) and the tool (5) and consists essentially of two coupling half shells (9, 10), one of which is fixedly mounted on a rotary spindle (7) supported in the toolholder (3) and drivable if required, and the other of which is fixedly arranged at the toolhead (11); these half shells are radially coupled and then locked. The locking device (21) is designed so that, in the unlocked condition, the rotary drive mechanism (6) of the rotary spindle (7) is blocked. The quick-action coupling device (4) also permits a linear drive action (8, 19) for opening and closing tongs (5a, 5b) or the like, and is capable of transmitting high bending moments and/or torques with simultaneously high transverse and longitudinal forces.

5 Claims, 5 Drawing Sheets

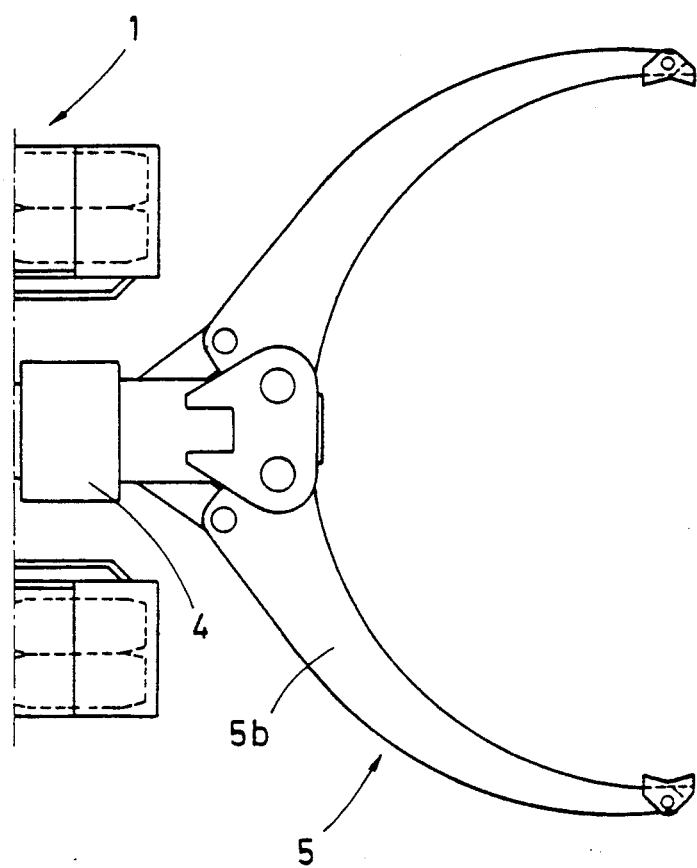

QUICK-ACTION COUPLING FOR FORGE AND CONVEYOR MANIPULATORS

The invention relates to a quick-action coupling device for forge and conveyor manipulators.

DOS 2,731,792 describes a charging machine comprising a motor-driven lift truck and a quick-action coupling device for the selective mounting of attachments, such as charging boxes, charging tongs, or poking rods. However, in this conventional apparatus the working appliances must in each case be exchanged together with their drive units. This is disadvantageous because the various working appliances, equipped with their own drive units, are very expensive. Furthermore, in each instance the energy supply conduits (hydraulic and/or electrical connections) must be separated and, respectively, joined. Even though there exist rather low-leakage couplings for hydraulic conduits, the efflux of hydraulic oil, even though in merely small quantities, cannot be entirely avoided.

According to U.S. Pat. No. 4,087,010, a tool, e.g. a hydraulic hammer for breaking up paving, is coupled to an excavator bucket by means of a similar coupling device. Here, too, the hydraulic connections must be broken and, respectively, established with each tool change.

The invention is based on the object of providing a quick-action coupling device making it possible to exchange only the purely mechanical part of tools, e.g. tongs, without their drive units, and being capable of transmitting high bending moments and/or torques with simultaneously high transverse and longitudinal forces.

The invention avoids the aforedescribed disadvantages of conventional quick-action coupling devices for the changing of tools and/or working appliances of forge and conveyor manipulators. The tools can be, for example, ingot tongs or disk tongs requiring, in addition to a rotary drive unit, also an axial linear drive for opening and closing the tongs. The special advantages of the quick-action coupling device according to this invention are to be seen in that, in case of a tool change, only the tool proper, e.g. the tongs, has to be exchanged whereas the drive units, e.g. pressure medium cylinder and rotary drive mechanism, with their connecting lines remain in the toolholder. The initial investment costs are considerably lowered, and tool change is substantially simplified because in the present case only approximately one-half of the equipment, which is frequently very heavy, needs to be exchanged. Oil contamination or oil losses do not occur since it is no longer necessary to sever or join any hydraulic conduits.

Figure 2:
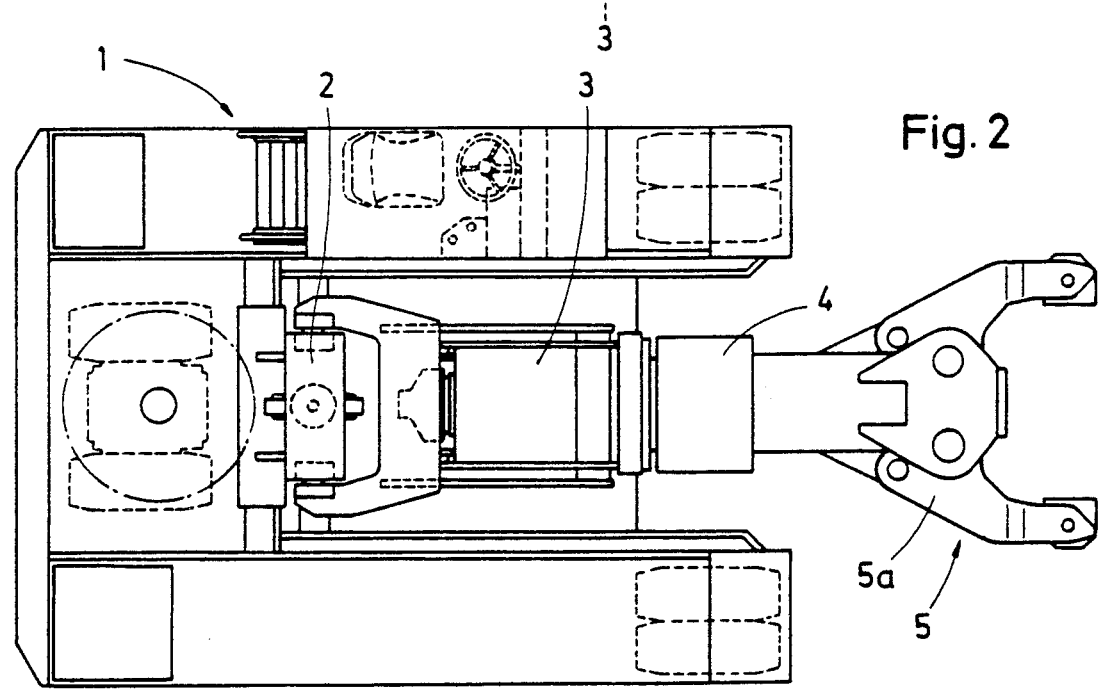
Figure 3:
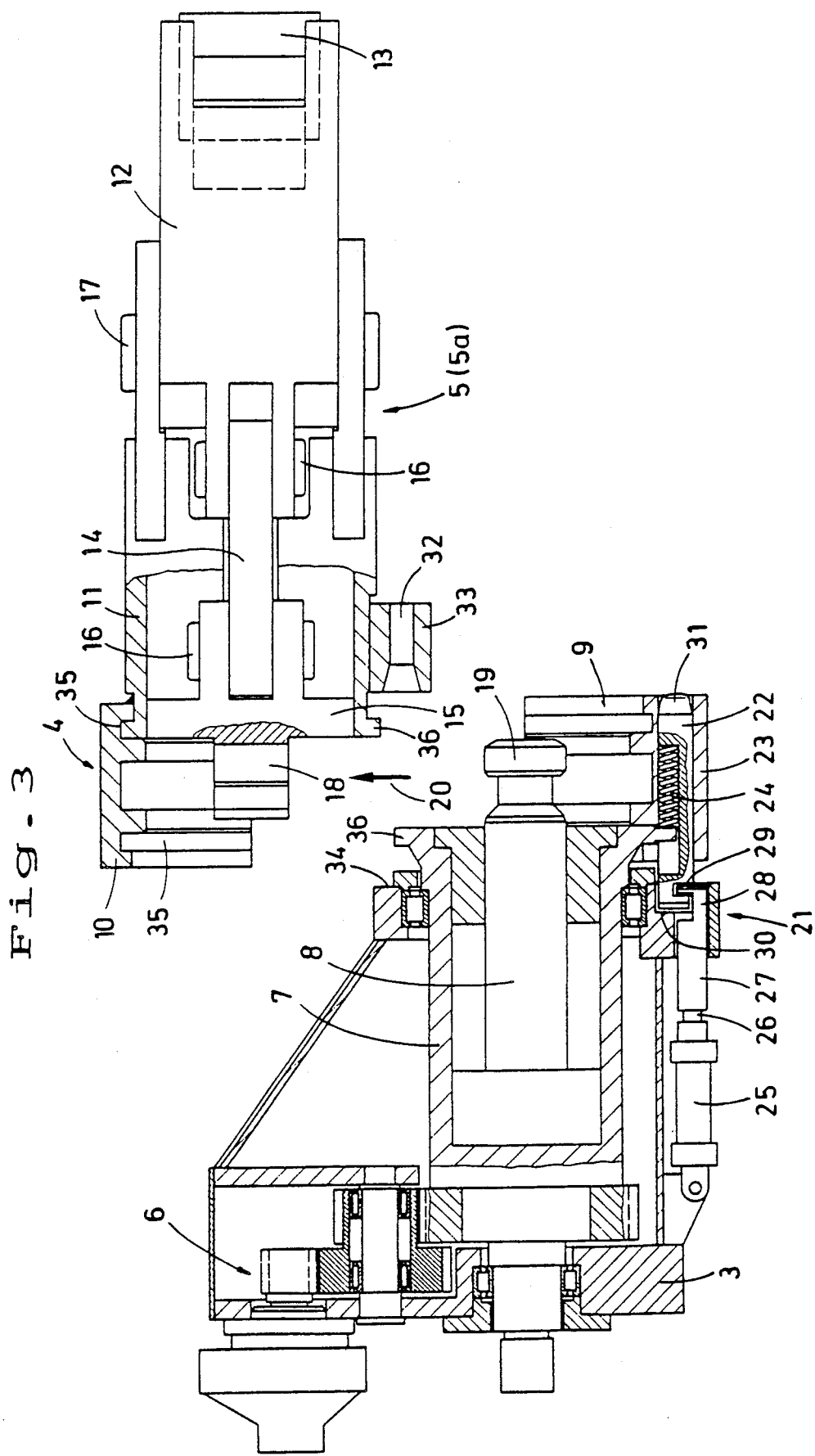
Figure 4:
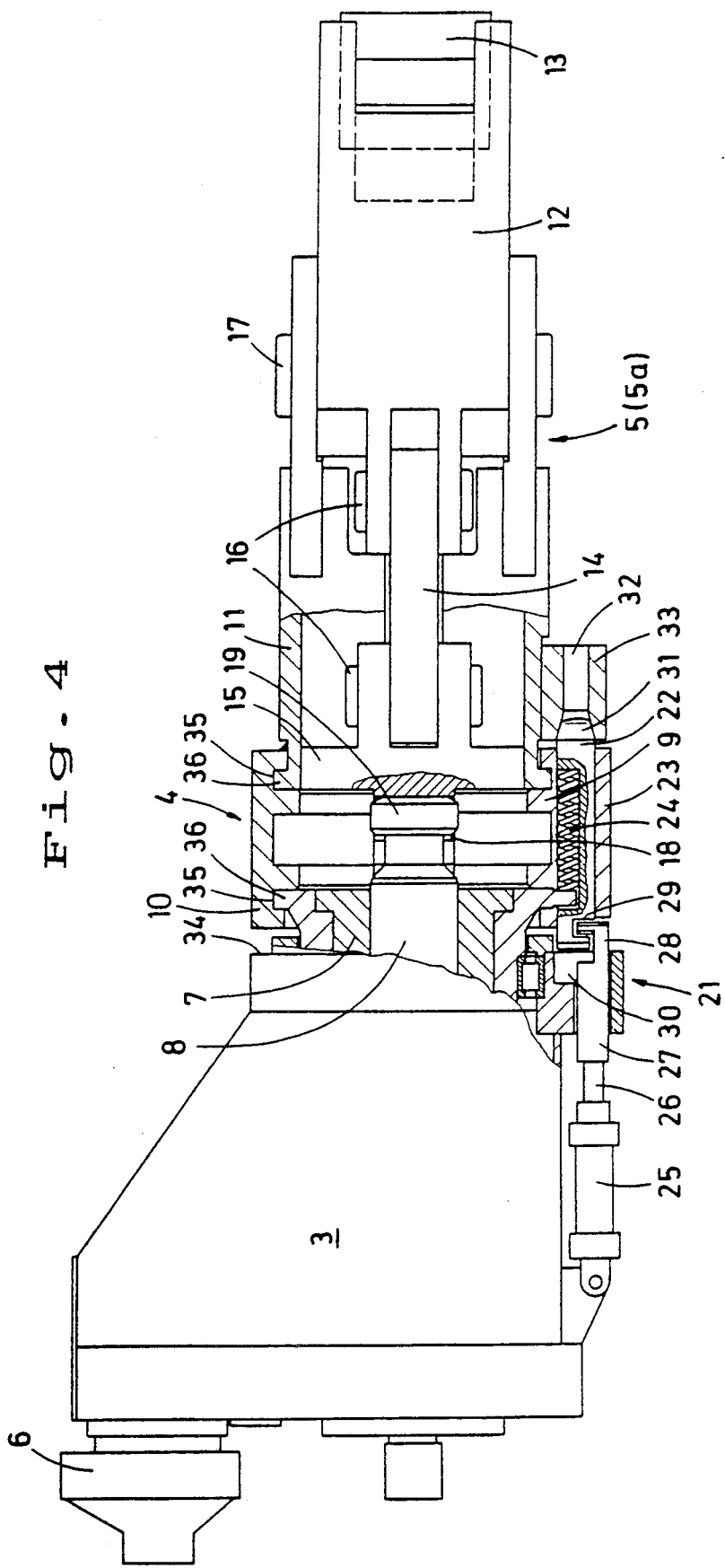
Figure 5:
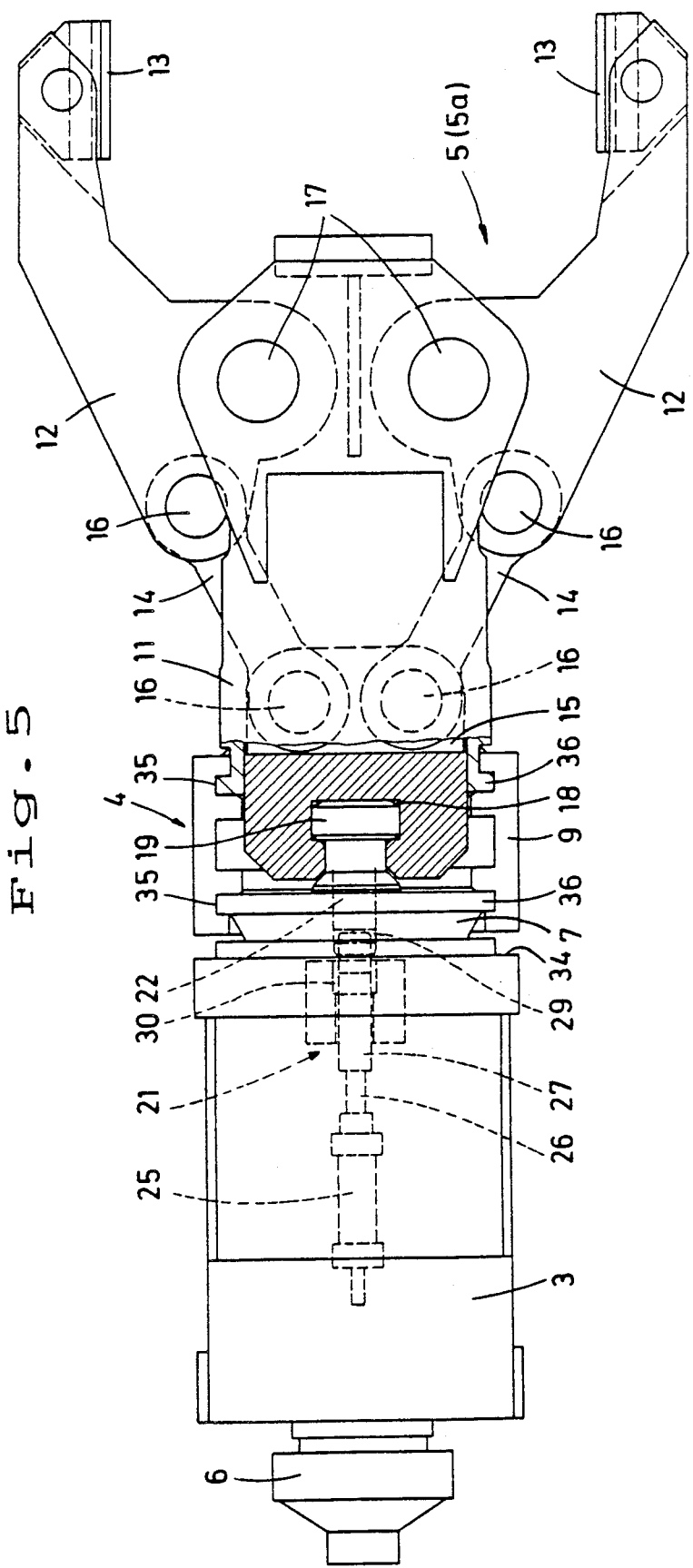

One embodiment of the quick-action coupling according to this invention will now be described with reference to the drawings wherein:

FIG. 1 shows, in a lateral view, a forge and conveyor manipulator wherein the quick-action coupling is utilized for coupling ingot tongs, FIG. 2 is a top view of the manipulator according to FIG. 1, FIG. 2a shows a top view of a disk tong unit which can be coupled, as a tool, to the manipulator of FIGS. 1 and 2, FIG. 3 shows, in a lateral view and partially in section, details of the quick-action coupling device prior to the coupling step, FIG. 4 shows the same view in the coupled condition, and FIG. 5 shows a top view, partially in section, of the quick-action coupling device.

FIGS. 1 and 2 show a manipulator 1, designed as a vehicle, with a lift frame 2 by means of which a toolholder 3 can be moved upwards and downwards. A tool 5, in the present case a pair of ingot tongs 5a, is connected to the toolholder 3 by way of a quick-action coupling device 4. The drive mechanisms for the tool 5 for the closing, opening, and rotating of the same are located exclusively in the toolholder 3.

FIG. 2a shows in a top view a disk tong pair 5b which can be coupled, as the tool 5, in place of the pair of ingot tongs 5a to the manipulator 1 with the aid of the quick-action coupling device 4.

FIGS. 1, 2 and 2a serve merely for the purpose of illustrating a preferred case of usage of the quick-action coupling device 4; the latter will now be described in greater detail with reference to FIGS. 3 through 5.

FIG. 3 shows, in an exploded view, i.e. in the uncoupled condition or, respectively, in the condition prior to the coupling connection, the toolholder 3 and the tool 5, for example the ingot tongs 5a according to FIGS. 1 and 2. The toolholder 3 contains the aforementioned drive mechanisms for the tool 5, namely the rotary drive unit 6 for rotating the tool 5 about its longitudinal axis by way of a rotary spindle 7, and the linear drive unit by way of a piston rod 8 for the opening and closing of the tongs 5a (or 5b, according to FIG. 2a).

The quick-action coupling device 4 consists of a first coupling half shell 9 fixedly connected to the rotary spindle 7 or being integrally formed with the latter, and of a second coupling half shell 10 fixedly joined to a toolhead 11 of the tool 5 or of the tongs 5a and 5b, respectively. According to FIGS. 3-5, showing the tongs 5a according to FIGS. 1 and 2, these tongs consist of tong arms 12 with tong jaws 13 and of connecting straps 14 connecting the tong arms 12 to a slide 15 in the toolhead 11 by way of joints 16 whereas the tong arms 12 proper are pivotably supported about joints 17 at the toolhead 11.

The slide 15 exhibits a T-groove 18 which after the radial converging of the coupling half shells 9, 10, encompasses a hammerhead 19 of the piston rod 8 so that a driving connection is established between the piston rod 8 and the tool 5. The converging of the coupling half shells 9, 10 is brought about by moving the manipulator 1 underneath the opened tool 5, resting on a trestle or rack, and then moving the hoisting frame 2 upwards in the direction of arrow 20 in FIG. 3 until the coupling half shells 9, 10, as well as the hammerhead 19 of the piston rod 8 and the T-shaped recess 18 of the slide 15 have reached their coupled position according to FIGS. 4 and 5.

This coupled position is secured by a locking means 21 which comprises a locking pin 22 displaceably supported in a guide means 23 arranged at the rotary spindle 7; this pin is pretensioned by means of a spring 24 in the locking position (toward the right in FIGS. 3–5) and is operable with the aid of a pressure medium cylinder 25 or manually. A piston rod 26 of the pressure medium cylinder 25 is connected with a push rod 27 supported at the toolholder 3, this push rod engaging with its free end 28 designed in a hook shape into a corresponding recess 29 at the rear end of the locking pin 22, namely only in a basic rotary position of the rotary spindle 7 as can be derived from FIGS. 3 and 4.

In FIG. 3, the locking pin 22 is in the rearward locking position wherein it engages in a groove 30 in the toolholder 3 so that the rotary drive unit 6 of the rotary spindle 7 is blocked.

In FIGS. 4 and 5, the locking pin 22 is in the forward locking position and engages herein, with a beveled or conically fashioned end 31, into a correspondingly beveled or conically widened bore 22 of a locking member 33 located at the toolhead 11. In this arrangement, the locking pin 22 is extended out of the groove 30 of the toolholder 3 so that the rotary drive means 6 of the rotary spindle 7 is released. During rotation of the rotary spindle 7 and of the tool 5, the locking pin 22 can then freely participate in the rotation in front of an annular shoulder 34 of the toolholder 3, this annular shoulder preventing unlocking of the quick-action coupling device (4) in all rotary positions of the tool 5, except for the basic rotary position.

In the coupled condition, inner peripheral grooves 35 of the coupling half shells 9, 10 extend around flanges 36 at the rotary spindle 7, on the one hand, and at the toolhead 11, on the other hand, thus establishing a shape-mating connection between the rotary spindle 7 and the tool 5 or 5a. Since the piston rod 8 and also the T-groove 18 at the slide 15 of the toolhead 11 are located exactly axially with respect to the axis of the rotary spindle 7, an operation of the tool 5, i.e. an opening and closing of the tongs 5a, is possible in any rotary position of the tool 5 by shifting the piston rod 8 which latter can be actuated by a pressure medium, e.g. in a hydraulic fashion.

I claim:

1. Quick-action coupling for forge and conveyor manipulators, comprising a toolholder (3), a rotary spindle (7) mounted for rotation on the toolholder (3) about a horizontal axis, means carried by the toolholder (3) for rotating the rotary spindle (7) about said axis, a tool head (11) laterally engageable with and disengageable from the toolholder (3) by movement in a direction transverse to said axis, tongs (5) carried by the tool head (11) for clamping and moving a workpiece, power means (8) reciprocable along said axis and engageable with said tongs for opening and closing said tongs when said tool head is engaged with said toolholder, and means (21) releasably interlocking said toolholder (3) and said tool head (11) for conjoint rotation about said axis, said interlocking means comprising locking means (22) having a forward position and a rearward position, said locking means (22) locking, in said forward position, said tool head (11) and toolholder (3) together for conjoint rotation about said axis, and in said rearward position locking said toolholder (3) and said rotary spindle (7) together to prevent rotation of said rotary spindle (7) relative to said toolholder (3).

2. Quick-action coupling as claimed in claim 1, wherein said locking means comprises a locking pin (22) mounted on the rotary spindle (7), said locking pin being disposed parallel to and movable parallel to said axis, said locking pin engaging, in said forward position, a recess (32) in the tool head (11) and in said rearward position engaging in a recess (30) in said toolholder (3).

3. Quick-action coupling as claimed in claim 2, wherein said locking pin can be locked and released only in one position of the tongs (5) relative to the rotary spindle (7).

4. Quick-action coupling as claimed in claim 2, and a pressure medium cylinder (25) for operating said locking pin.

5. Quick-action coupling as claimed in claim 2, and a spring (24) urging said locking pin (22) forward, said locking pin (22) and said recess (32) in said tool head (11) having interengaging inclined surfaces.

* * * * *